United States Patent [19]

Kikkawa et al.

[11] Patent Number: 4,676,647
[45] Date of Patent: Jun. 30, 1987

[54] FILM THICKNESS MEASURING DEVICE AND METHOD

[75] Inventors: Atsushi Kikkawa, Osaka; Noriyuki Kondo, Kyoto, both of Japan

[73] Assignee: Dainippon Screen Mfg. Co., Ltd., Kyoto, Japan

[21] Appl. No.: 801,788

[22] Filed: Nov. 26, 1985

[30] Foreign Application Priority Data

Mar. 22, 1985 [JP] Japan .................................. 60-59162

[51] Int. Cl.⁴ .............................................. G01B 11/06
[52] U.S. Cl. ..................................... 356/382; 356/328
[58] Field of Search ................ 356/355, 357, 382, 328

[56] References Cited

U.S. PATENT DOCUMENTS

| | | | |
|---|---|---|---|
| 3,645,623 | 2/1972 | Patten | 356/1 |
| 4,254,337 | 3/1981 | Yasujima et al. | 250/339 |
| 4,308,586 | 12/1981 | Coates | 364/525 |
| 4,355,903 | 10/1982 | Sandercock | 356/382 |
| 4,606,641 | 8/1986 | Yamada et al. | 356/382 X |

FOREIGN PATENT DOCUMENTS

| | | |
|---|---|---|
| 2935716 | 6/1980 | Fed. Rep. of Germany . |
| 3103082 | 1/1982 | Fed. Rep. of Germany . |
| 2435019 | 3/1980 | France . |
| 55-35214 | 3/1980 | Japan . |
| 0095807 | 7/1980 | Japan .................. 356/382 |
| 56-126704 | 5/1981 | Japan . |
| 0111405 | 9/1981 | Japan .................. 356/382 |
| 0131007 | 8/1982 | Japan .................. 356/382 |
| 653766 | 1/1986 | Switzerland . |
| 2033079 | 5/1980 | United Kingdom . |
| 2069130 | 8/1981 | United Kingdom . |

Primary Examiner—Eugene R. LaRoche
Assistant Examiner—David Mis
Attorney, Agent, or Firm—Lowe Price LeBlanc Becker & Shur

[57] ABSTRACT

Apparatus and a method are disclosed for measuring the thickness of a very thin transparent film formed, for example, on a photomask or wafer for an integrated circuit. Diffracted reflected light from a film specimen is converted photoelectrically by use of a one dimensional image sensor array and then by an A/D converter having a resolution of more than $2^{10}$, which allows for discrimination into 1,000 graduations of output level. Enhanced precision in determining film thickness is obtained by utilizing this high discrimination to first determine the variations among individual elements of the one dimensional sensor array and compensating for them, as well as by using known averaging and statistical techniques to generate output for comparison to reference data from film specimens of known thickness.

13 Claims, 12 Drawing Figures

FILM THICKNESS MEASURING DEVICE AND METHOD

TECHNICAL FIELD

This invention relates to a film thickness measuring device and a method of using the same, and more particularly to a device and method for the measurement of the thickness of a transparent film formed on a substrate, such as in a photo mask or wafer for manufacture of integrated circuits (hereinafter called "ICs").

BACKGROUND OF THE INVENTION

Photoresist film, silicone oxide film or the like, when deposited on the substrate of a photomask or wafer for IC use generally forms an extremely thin transparent film having a thickness approximately 400 Å to 30,000 Å. The typical line width of an IC pattern obtained thereon through exposure development, etching, etc., is approximately 0.3 to 100 $\mu$m.

For proper production control of ICs, therefore, a film thickness measuring device is needed with which such film thickness can be measured accurately with high repeatability. In known devices for measuring film thickness there has been commonly used a method in which measurement is made of the diffracted reflection spectra for a large number of reference specimens. The reference values are stored in the memory of a signal processing device such as a micro-computer, and then measurement is taken of the diffracted light reflection spectrum of the specimen to be measured to thereby determine the specimen film thickness by the ratio of its spectral photo-intensity to the reference specimen. FIG. 1 depicts prior art apparatus of this type. In FIG. 1, specimen 2 is set on the specimen mount 3 of microscope 1 and a white light source 5 illuminates the specimen through the object lens 4. Eyeglass 6 is for observing the surface of the specimen 2 as well as focal point adjustment 7, which has a small aperture for allowing through passage of light reflected from specimen 2. A concave diffraction grating 8 generates a diffracted spectrum, and sweeping device 9 sweeps a given wavelength range, e.g. 400–800 nm, with the concave diffraction grating 8 turning in the direction of the arrows A. 9a is a wavelength counter, 10 a stepping motor, 11 a slit, 12 a photomultiplier tube, and 13 a current-voltage converter with built-in amplifier. Micro-computer 14 controls a stepping motor 10 and also does statistical processing of photo intensity signal K from the current-voltage converter 13 for computing the film thickness and outputting the result, as necessary, to the CRT 15a or to an output device 15 of a printer 15b. 14a is the keyboard of the computer 14.

With this known film thickness measuring device, the film thickness is measured as follows: with the specimen 2 placed on specimen mount 3 of the microscope, the measuring device is started with the intersecting point of two marking lines matching a measuring point P, best seen in FIG. 7, of the specimen 2, confirming this through the eyeglass 6. The reflected light from specimen 2 enters incidently into the concave diffraction grating 8 through the aforesaid optical system of microscope 1. This concave diffraction grating generates a diffracted spectrum corresponding to any given wavelength in a predetermined range, e.g. 400–800 nm, the grating being rotatably driven via sweeping device 9 by stepping motor 10. This diffracted spectrum enters through a slit 11 into a fixed photomultiplier tube 12 and generates a serial spectrum signal I synchronous with the sweeping by the concave diffraction grating 8. Then a photo-intensity signal K is obtained that corresponds to the reflection spectrum multiplied by the current-voltage converter 13. This photo-intensity signal K is processed by the micro-computer 14 for computation of film thickness, and the result is displayed on the output device 15 or printed out. Prior to measurement of specimen 2, measurement is made of the diffracted reflected spectra of a multiplicity of reference specimens of known film thicknesses, and the data for these are stored in the microcomputer 14, as mentioned above, to serve as reference data. In the prior art technique, in which the spectral signals are obtained from the photomultiplier tube serially and synchronously with sweeping by the concave diffraction grating, the diffracted spectral signals are outputted successively during sweeping. Hence there is a limitation due to shortness of the measuring time, this being particularly the case when the sweeping is done a plurality of times for more measured data. Furthermore, during this sweeping, the device is subject to external disturbances, e.g., variations in the intensity of light source due to mechanical vibration, and this may reduce the measurement precision. The present invention is aimed at providing a film thickness measuring device free of such problems.

DISCLOSURE OF THE INVENTION

It is an object of this invention to provide apparatus to accurately determine the thickness of a thin film.

It is another object of this invention to provide apparatus to accurately and rapidly determine the thickness of a thin film.

It is a further object of this invention to provide a method for accurately and rapidly determining the thickness of a thin film.

In order to accomplish the aforesaid objects in the present invention, the specimen is illuminated with a white light, the reflected light is projected onto a fixed diffraction grating through a magnifying optical system so that a corresponding reflective spectrum is obtained, and the spectrum is then photoelectrically converted into digital signals for processing by a signal processing device such as a microcomputer. The photoelectric conversion means of this invention includes a one dimensional image sensor array, and the signals therefrom, outputted in parallel, are amplified by a parallel-series conversion circuit (hereinafter called "P/S conversion circuit") and outputted serially. The output signals are converted into digital signals by an A/D converter having a resolution of more than $2^{10}$. The signal processing device is also provided with at least the sensitivity information relating to each of the elements of the one dimensional image sensor array, so that the aforesaid digital signals are compensated for on the basis thereof. With the image signals outputted by the individual elements of the one dimensional image sensor array converted into digital signals by an A/D converter having a resolution of $2^{10}$ or more, the image signal level can be discriminated into more than 1,000 graduations. The variation in sensitivity among the individual elements of the one dimensional image sensor array is compensated for prior to the computation of the film thickness, hence a very broad dynamic range can be secured even by the use of a one dimensional image sensor array, and the spectral signals in a given range of wavelength can be obtained very rapidly.

DESCRIPTION OF THE PREFERRED EMBODIMENT

The present invention is based on the discovery of the fact that an ample dynamic range and ample signal/-noise ratio (S/N, hereinafter are obtained that are comparable to those attainable by the use of a photomultiplier tube even if a one-dimensional image sensor array is used, and by its application to a film thickness measuring device.

Figure 1:
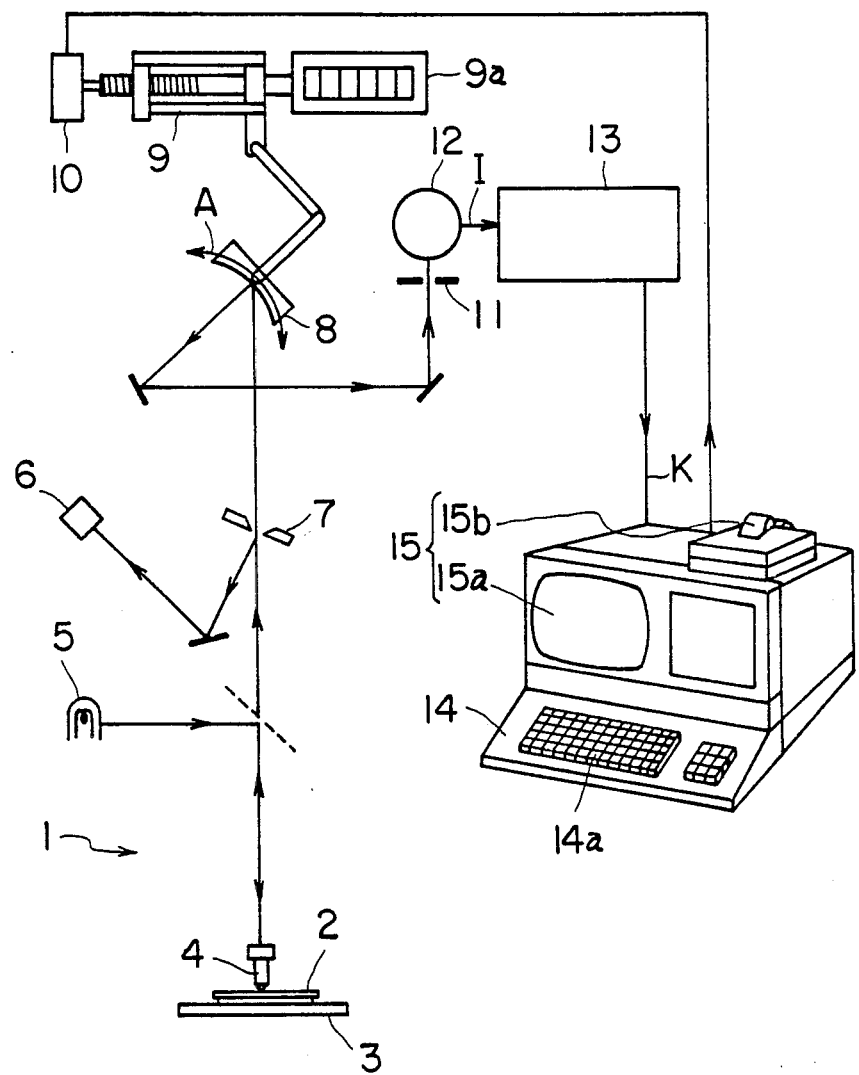
FIG. 1 is a schematic diagram of a prior art film measuring device.
Figure 2:
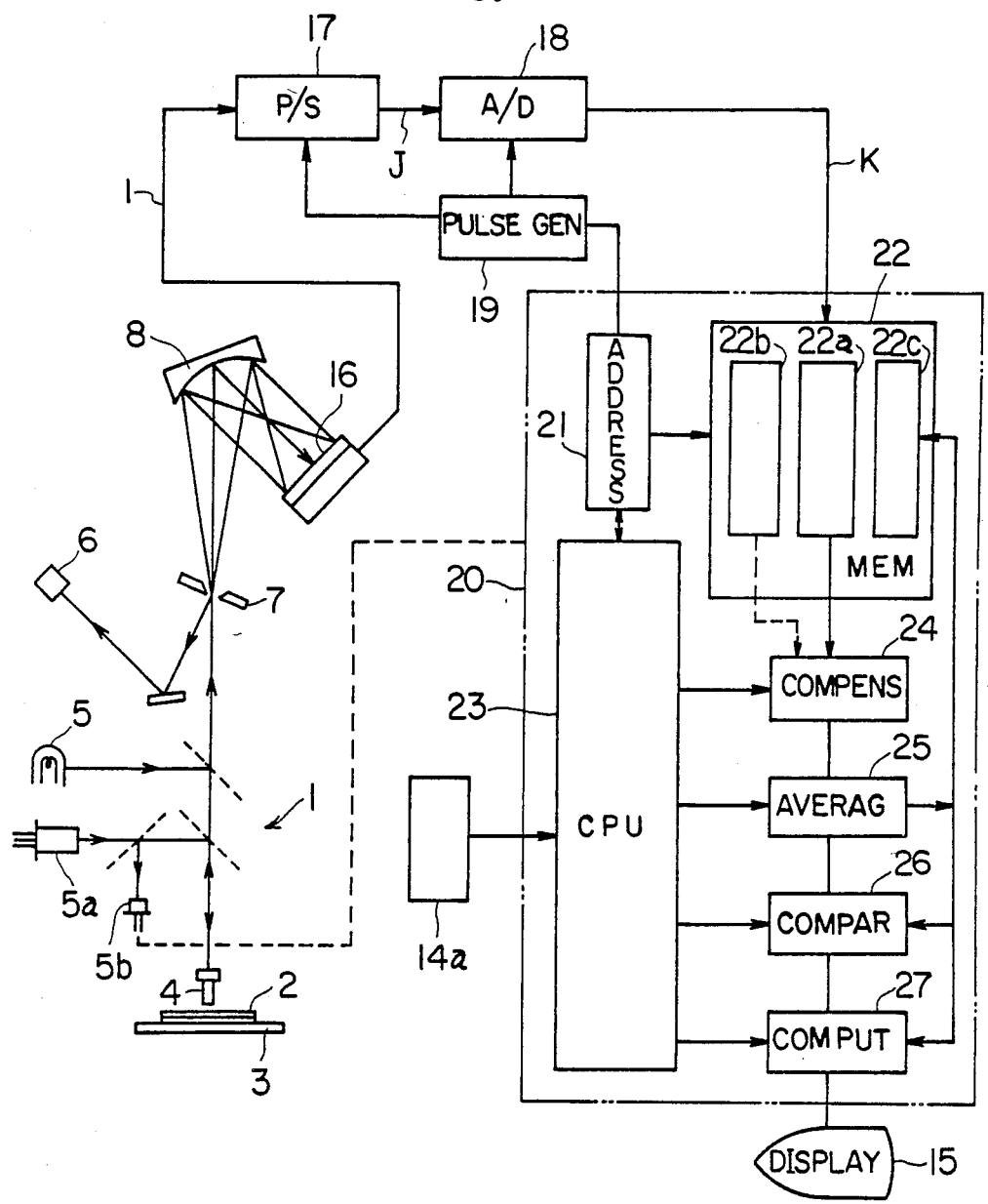
FIG. 2 is a block diagram of the preferred embodiment of the invention.

FIG. 2 is a block diagram showing the principal elements of a film thickness measuring device according to the preferred embodiment of the present invention. In FIG. 2, a concave diffraction grating 8 generates a spectrum of the reflected light from film specimen 2. The concave diffraction grating 8 can be substituted for by alternative equivalent means, e.g., a holographic diffraction grating of the flat field type. The one-dimensional image sensor array 16 is composed of Charge Coupled Devices (CCD, hereinafter). A P/S conversion circuit 17 serially outputs the image signal I, photoelectrically converted by the one dimensional image sensor array 16, in parallel. A/D converter 18 has a resolution preferably of 10 bits ($2^{10}$), and timing pulse generating circuit 19 outputs timing pulse signals to the P/S conversion circuit 17, the A/D converter 18 and an address designating means 21 of a signal processing device 20 (as described more fully below). The aforesaid one dimensional image sensor array 16 is composed of 2,048 linearly arranged elements each having a dimension of, for example, approximately 15 μm × 15 μm, and in this case it is possible to photo-electrically convert the spectrum, for example in the range 400 nm to 800 nm, as it is generated by the concave diffraction grating 8.

A one dimensional image sensor array PDA (Photo Diode Array) can also be used instead of the CCD. When the A/D converter 18 has 10 bits of resolution, the signals J outputted serially after amplification by the P/S conversion circuit can be converted into digital signals K of 1024 resolution graduation levels. The experimental data show that when a 12-bit A/D converter is used a good reproducibility is ensured even when the signal level is subdivided into 4,096 resolution graduations. Such digital signals K are written into 2,043 different addresses in a spectral information memory sector 22a of the internal memory 22 of the signal processing device 20 by the aid of the address designating means 21, when the image sensor array used consists of 2,048 elements as mentioned above. The signal processing device 20 is composed of a central processing unit (hereinafter called "CPU") 23, the address designating means 21, the memory 22 for storing information such as spectral information, a spectral information compensation means 24, an averaging means 25, comparison means 26 for comparison with the reference specimens or reference data and a film thickness computing means 27, these being so arranged that the thickness of the film specimen is outputted to the outputting device 15 according to the flow chart shown in FIG. 3. It is generally necessary to compensate the 2,048 pieces of spectral information stored in the spectral information memory sector 22a, because the photo-electrically converted output from the one dimensional image sensor array 16 is expected to have a variation with regard to element's sensitivity of up to +/−10% and, furthermore, a slight dark current is present even when no element is exposed to light. In the film thickness measuring device of the present invention, therefore, it is so arranged that the intensity of dark current $D_i$ (i=-1-2,024) and the sensitivity $S_i$ (i=1-2,024) are prestored as sensitivity information in the sensitivity information memory sector 22b, sensitivity information $D_i$ and $S_i$ are read out corresponding to each spectral information $X_i$ (i=1-2,024) for compensation to be made by a spectral information compensating means 24 according to, for example, ($X_i - D_i$), to thereby approximate the signal level of the digital image signal K as spectral information. The compensated spectral information is then statistically treated, e.g., by averaging, and comparison made with data obtained on reference specimens of known thickness for the film thickness of the specimen to be computed thereafter.

Such averaging methods are believed to be well known to those skilled in the art but here, with a given element as the central one of five adjacent elements, two elements on either side of it are taken up and averaging is made of these five elements, for the average thus obtained to be taken as the output value for the particular central element. This averaging is repeated, e.g., three times, for improved precision.

Figures 5A, 5B, 5C, 5D:
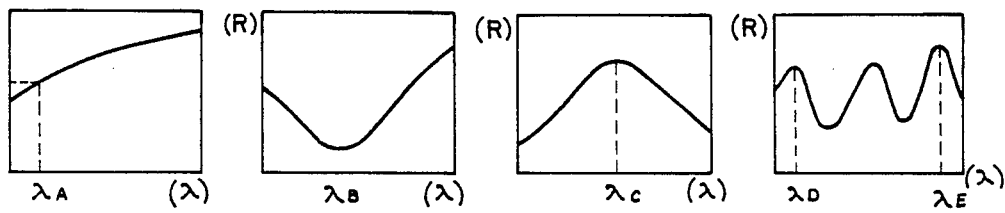
FIGS. 5(a)-5(d) are other views of the graph of FIG. 4(C).

The pieces of spectral information thus averaged are then compared in the next comparison means 26 with the reference sorted data classified for the individual ranges of film thickness, and as exemplified in FIGS. 5a-5d, discrimination is made into cases of a monotonal increase per FIG. 5(a), with one minimum, per FIG. 5(b) with one maximum per FIG. 5(c) and with more than one minimum and one maximum per FIG. 5(d). Thereafter, the film thickness is computed according to the spectral information by the film thickness computing means 27 for the aforesaid individual cases. If the profile of the spectral information about the specimen to be measured is as shown in FIG. 5(a), first the spectral photointensity $R_A$ against a given wavelength $\lambda_A$ is obtained, and it is then compared with a large number of written-in spectral photo-intensities of a plurality of reference specimens to thus retrieve the reference specimen best matching the spectral photo-intensity $R_A$ for the aforesaid wavelength $\lambda_A$. If any of the reference specimens is found to match the specimen measured, then the thickness of the particular reference specimen is determined to be the film thickness sought. If no matching reference specimen is found, then two approximating reference specimens are taken for the specimen's film thickness to be obtained by interpolation between them. Such a method is frequently used as a "calibration method" in the field of measuring devices, etc. The above-described film thickness computation technique is applicable to the cases of FIGS. 5(b), 5(c) and 5(d) as well, and the measuring precision can be easily improved by increasing the number of reference specimens written into the memory sector 22c, by increasing the amount of data on each specimen and, further, by increasing the number of specific wavelengths corresponding to the spectral photo-intensity to be compared.

Figure 3:
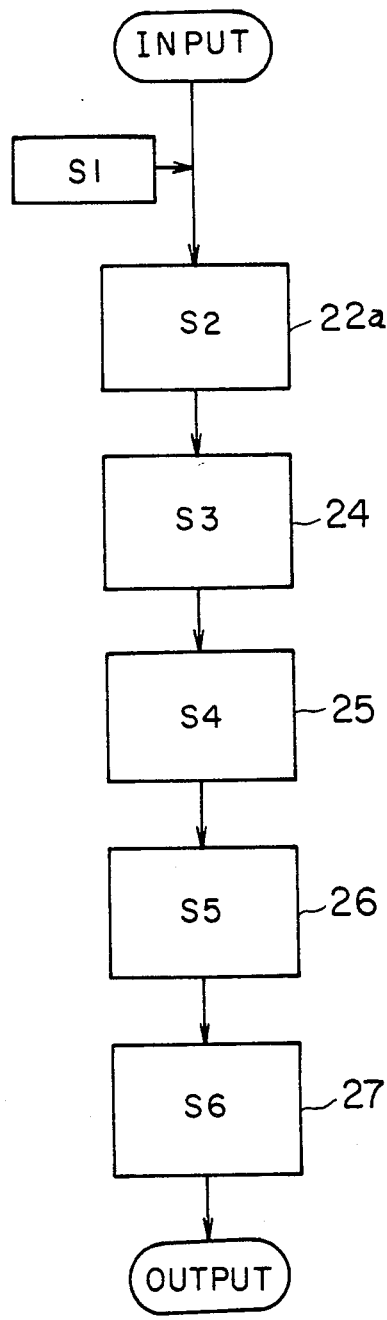
FIG. 3 is a flow chart of the signal processing steps of the invention of FIG. 2.

FIG. 4 is a graph showing the mode of signal processing done according to the flow chart shown in FIG. 3, wherein on the abscissa is plotted the graduated wavelength (nm), while on the ordinate is plotted the graduated output levels of signals outputted serially.

Figure 4A:
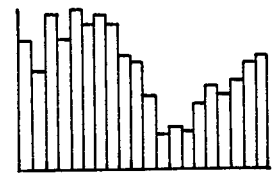
FIGS. 4(A)-4(C) are graphical representations of signal processing according to the flow chart of FIG. 3.
Figure 4B:
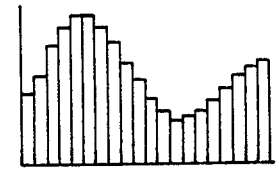

Described below is the function of the film thickness measuring device of this embodiment with reference to FIGS. 2–4. When key 14a of the signal processing device 20 has been actuated to start the film thickness measuring device, the individual elements of the one dimensional image sensor array 16 accumulate, in step $S_1$, the spectral quantities of light from the concave diffraction grating for the preset integrating time. Then, in step $S_2$, the spectral information K of the signal level, as shown in FIG. 4(A), is stored in the spectral information memory sector 22a of the internal memory 22 through P/S conversion circuit 17 and A/D conversion circuit 18. This spectral information is approximated to the true value in step $S_3$, as aforesaid, by the spectral information compensation means 24, and compensated to a signal level as shown in FIG. 4(B). Finally, in step $S_4$, a smooth signal level such as shown in FIG. 4(C), is obtained by averaging means 25.

Figure 4C:
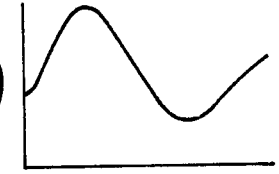
Figure 7:
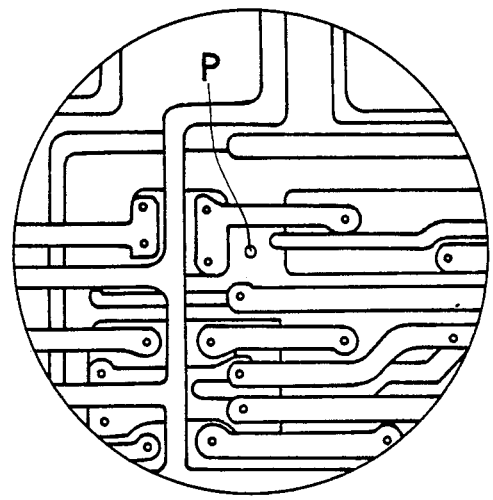
FIG. 7 is a magnified view of a specimen through a microscope.
Figure 6:
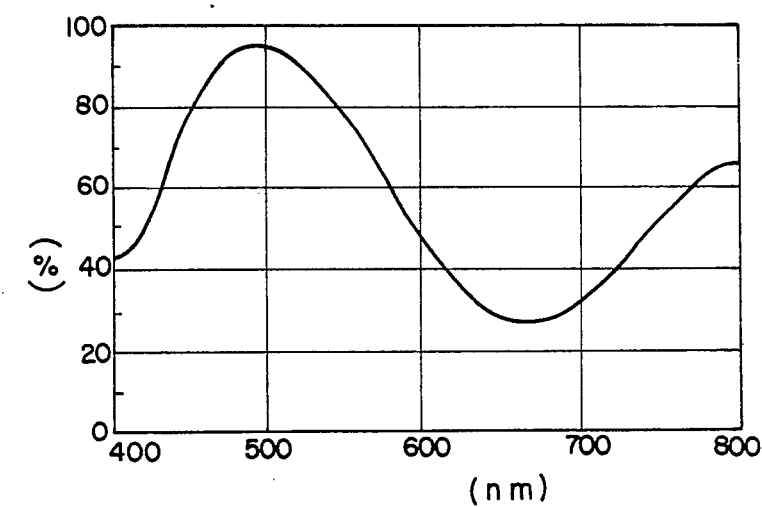
FIG. 6 is enlarged view of the graph of FIG. 4(C).

FIG. 6 is an enlarged version of FIG. 4c and corresponds, for example, to a case in which a reflected spectrum of $SiO_2$ specimen of film thickness of 3392 Å is outputted through an outputting device 15 such as a printer. The spectral information thus averaged is tentatively stored in an interim memory 22c, compared with the prestored reference data in the memory 22c by a comparison means 26 in step $S_5$, and then used for computations to determine the film thickness in computing means 27, and the result is outputted to an outputting device 15 such as a CRT or printer.

In FIG. 2 the reference numeral 5a designated a semiconductor laser beam source and 5b is a photoelectric conversion means for photoelectric conversion of the monochromatic semiconductor laser beam reflected by the specimen 2. Laser source 5a is additionally installed with the aforesaid film thickness measuring device so as to be selectable as an alternative to the white light source 5, especially when it is desired to improve the precision in measuring a thin film less than 300 Å in thickness. In the above-mentioned embodiment, an A/D converter having a resolution of $2^{10}$ was used in order to obtain spectral information with a final resolution of more than $2^{10}$, but the present invention is not limited thereby and it is also possible to use an A/D converter having an ordinary resolution of $2^8$ to obtain a digital signal of a resolution of more than 1 in $2^{10}$ by one of the known data processing methods.

The present invention as described above has a number of advantages over the prior art:

a. since a one dimensional image sensor array is used as photo-electric conversion means, so that reflected spectral signals for one sweeping are obtainable at once, it is possible to drastically shorten the time required for making each measurement.

b. Since no sweeping means is required, the construction of the spectral means can be extremely simplified and also allows elimination of measuring errors due to sweeping-caused disturbances, which further enhances measuring precision.

c. When the inter-element variation of dark current and sensitivity of the one dimensional image sensor array are compensated for, so that the spectral signal level is compensated to approach the true value, the same as or even higher reliability of spectral signal is attainable than when a conventional signal photomultiplier tube is used.

It should be apparent from the preceding that the invention may be practiced otherwise than as specifically described and disclosed herein. Modifications may therefore be made to the specific embodiments disclosed here without departing from the scope of this invention, and are intended to be included within the claims appended below.

What is claimed is:

1. A film thickness measuring device, comprising:
   a light source for lighting a film specimen with non-polarized light;
   a magnifying optical system for projection under magnification of light reflected by said specimen illuminated with said light source;
   a diffraction grating for generating a spectrum of the reflected light projected under magnification;
   means for photoelectrically converting of said spectrum, comprising a one dimensional image sensor array and a P/S (parallel/series) conversion circuit for outputting signals serially;
   an A/D (analog/digital) converter for A/D converting of output signals from said photoelectric conversion means;
   signal processing means for computing the thickness of said film specimen on the basis of output signals from said A/D converter; and
   outputting means for outputting said computed result.

2. A film thickness measuring device as recited in claim 1, wherein:
   said diffraction grating is a concave diffraction grating.

3. A film thickness measuring device as recited in claim 1, wherein:
   said A/D conversion means has a resolution higher than $2^8$.

4. A film thickness measuring device comprising:
   a light source for lighting a film specimen;
   a magnifying optical system for projection under magnification of light reflected by said specimen illuminated with said light source;
   a diffraction grating for generating a spectrum of the reflected light projected under magnification;
   means for photoelectrically converting of said spectrum, comprising a one dimensional image sensor array and a P/S (parallel/series) conversion circuit for outputting signals serially;
   an A/D (analog/digital) converter for A/D converting of output signals from said photoelectric conversion means;
   signal processing means for computing the thickness of said film specimen on the basis of output signals from said A/D converter, wherein said signal processing means serves as a means for storing sensitivity information relating to individual elements of said one dimensional image sensor array and also comprises a means for compensating the A/D converted signal on the basis of said sensitivity information; and outputting means for outputting said computed result.

5. A film thickness measuring device as recited in claim 4, wherein:

said signal processing device comprises
a central processing unit (CPU);
address designating means for designating addresses to elements of data;
memory unit for storing said sensitivity information, spectral information and interim information at the address corresponding to each element of said one dimensional image sensor array;
spectral information compensating means for compensating said spectral information on the basis of said sensitivity information relating to each said element;
averaging means for computing an average of a plurality of compensated spectral information;
reference data in predetermined form, based on film specimens of known thickness values;
comparison means for comparing the profile of the averaged spectral information with reference data for typological discrimination within a predetermined range and also for comparing the reference spectral information with the averaged spectral information of the specimen to be examined within said typological range; and
means for computing the film thickness on the basis of said comparison results.

6. A method for measuring the thickness of a thin transparent film, comprising the step of:

providing light for reflection from said film;
magnifying the image formed by said reflected light;
diffracting said magnified image to generate a spectrum corresponding to said film thickness to be measured;
photoelectrically converting said spectrum by a one dimensional image sensor array and a P/S (parallel/series) conversion circuit for generation of serial output signals;
converting said output signals into digitized signals; and
processing said digitized signals by comparison with reference data relating to known film thicknesses to compute the thickness of said thin transparent film.

7. A method for measuring film thickness according to claim 6, wherein:

said diffracting step includes passing said magnified image through a diffraction grating having a concave configuration.

8. A method for measuring film thickness according to claim 6, wherein:

said conversion to digitized signals is performed to a resolution higher than $2^{10}$.

9. A method for measuring film thickness according to claim 6, comprising the further step of compensating said digitized signal for variations among individual elements of said one dimensional image sensor array.

10. A method for measuring film thickness according to claim 9, comprising the further step of:

averaging a plurality of said digitized signals in a predetermined known manner prior to comparison of the resultant averaged value to said reference data.

11. A method for measuring film thickness according to claim 10, comprising the further step of:

comparing the distribution of said averaged value, within a predetermined range, with a matching distribution of reference data to more precisely determine said film thickness thereby.

12. A film thickness measuring device as recited in claim 4, wherein:

said diffraction grating is a concave diffraction grating.

13. A film thickness measuring device as recited in claim 4, wherein:

said A/D conversion means has a resolution higher than $2^8$.

* * * * *